US006734026B1

(12) United States Patent
Kenney

(10) Patent No.: US 6,734,026 B1
(45) Date of Patent: May 11, 2004

(54) PIPETTE GUN AND HOLSTER ASSEMBLY

(75) Inventor: James W. Kenney, Broomall, PA (US)

(73) Assignee: Drummond Scientific Company, Broomall, PA (US)

( * ) Notice: Subject to any disclaimer, the term of this patent is extended or adjusted under 35 U.S.C. 154(b) by 0 days.

(21) Appl. No.: 09/321,633

(22) Filed: May 28, 1999

(51) Int. Cl.$^{7}$ .............................. G01N 1/10; B01N 3/02

(52) U.S. Cl. .................... 436/180; 422/100; 73/863.32; 73/864; 73/864.01; 73/864.11; 73/864.14; 73/864.59

(58) Field of Search ............................ 422/100, 81, 99, 422/103, 104, 934; 436/180; 73/864, 863.32, 864.01, 864.11, 864.14, 864.59, 864.15, 864.22, 864.25

(56) References Cited

U.S. PATENT DOCUMENTS

| | | | | | |
|---|---|---|---|---|---|
| 3,311,331 | A | * | 3/1967 | Steimen | 248/22 |
| 3,719,087 | A | * | 3/1973 | Thiers | 73/425.6 |
| 4,066,234 | A | * | 1/1978 | Nycum | 248/358 R |
| 4,437,586 | A | * | 3/1984 | Columbus | 222/181 |
| 4,598,840 | A | * | 7/1986 | Burg | 222/135 |
| 4,624,147 | A | * | 11/1986 | Kenney | 73/864.15 |
| 4,888,974 | A | * | 12/1989 | Mandell | 72/391 |
| 5,090,255 | A | * | 2/1992 | Kenney | 73/1 R |
| 5,214,968 | A | * | 6/1993 | Kenney | 73/864.15 |
| 5,356,525 | A | * | 10/1994 | Goodale et al. | 204/602 |
| 5,599,316 | A | * | 2/1997 | Blakely | 604/232 |
| 5,616,871 | A | * | 4/1997 | Kenney | 73/864.14 |
| 5,704,495 | A | * | 1/1998 | Bale et al. | 211/71.01 |
| 6,011,336 | A | * | 1/2000 | Mathis et al. | 310/91 |
| 6,090,348 | A | * | 7/2000 | Steele et al. | 422/67 |

* cited by examiner

*Primary Examiner*—Jill Warden
*Assistant Examiner*—Brian R. Gordon
(74) *Attorney, Agent, or Firm*—Joseph M. Konieczny, Sr.

(57) ABSTRACT

A pipette gun and holster apparatus having a remote source of positive and negative air pressure. The holster supports the pipette gun above a work table with the pipette connector oriented generally, vertically downwardly. The holster has a base which may be fastened to a vertical wall. A mounting bracket is fixed to and extends transverse to the base. The bracket has a bottomless socket constructed and arranged to receive and removably hold the pipette gun by inserting the pipette connector into the socket. A switch deactivates the remote air pressure source when the pipette gun is parked in the holster and energizes the remote air pressure source when the pipette gun is removed from the holster. A method of metering fluid using a pipette gun and holster apparatus. The holster is removable fastened to a vertical surface next to or proximate a horizontal work table top. The pipette gun is parked in the holster above the work table with the pipette connector and pipette oriented generally, vertically downwardly out of contact with the table top. The pipette gun is removed from the holster and fluid is metered with the gun. The remote air pressure source is automatically inactivated when the pipette gun is parked in the holster and automatically activated when the pipette gun is removed from the holster.

17 Claims, 4 Drawing Sheets

PIPETTE GUN AND HOLSTER ASSEMBLY

FIELD OF THE INVENTION

The present invention relates to a pipette gun and holster assembly which can be mounted on a vertical surface above or proximate a horizontal work table.

BACKGROUND OF THE INVENTION

On an average day, a pipette gun may be used to meter hundreds of fluid samples. Inevitability, while using the pipette gun, a laboratory technician will be interrupted for a variety of reasons and must suspend use of the pipette gun. If the pipette gun assembly is set down on a table top, the pipette may become contaminated if it contacts the table top. Further, the sample fluid contained in the pipette may run out of the pipette if the pipette gun is set down flat on its side on the table top. Therefore, it would be desirable to provide a stand in which the pipette gun and pipette can be parked while not in use and which prevents contamination of the pipette or spillage of fluid from the pipette when the pipette gun is parked in the stand.

U.S. Pat. No. 5,616,871 (Kenney '871), incorporated herein by reference, describes a pipette stand which supports the pipette gun and pipette in an upright position on a table top so that the pipette does not contact the table top and so that any liquid in the pipette does not spill out of the pipette or flow back up through the pipette into the pipette gun. The pipette stand disclosed in Kenney '871 is only useful, however, if there is available space on the table top on which the pipette stand may be rested. Too often the table top is overly crowded with scientific apparatus. Therefore, it would be desirable to provide a pipette gun stand which can be mounted on the unobstructed vertical walls surrounding or proximate the table top.

In many laboratories, a pipette gun is used continuously for several hours by a technician. Over time, the weight of the pipette gun causes fatigue to the technician. For example, a pipette gun having an internal air pressure source may weigh up to 12 ounces. Prior art pipette guns having a remote, external air pressure source are lighter and reduce fatigue. However, the elastomeric tubing connecting the remote air source to the pipette gun is cumbersome and often interferes with the work area. Therefore, it would be desirable to provide a pipette gun having a remote air source and an elastomeric tubing design which does not interfere with the work area.

In order to deactivate the remote, external air pressure source for a short period of time while the pipette gun is not in use, the source must be switched off manually by either unplugging the air pressure source or flipping an external switch on the air pressure source. Because it is inconvenient to repeatedly turn the air pressure source off and on, technicians typically leave the air pressure source activated even while the pipette gun is not in use. Continuously running the remote air source greatly shortens its life-span. Therefore, it would be desirable to provide a pipette gun having a remote air source which is automatically activated and inactivated when the pipette gun is removed from and inserted into, respectively, the pipette gun holder so that the life-span of the remote air pressure source can be extended.

SUMMARY OF THE INVENTION

The present invention provides a pipette gun and holster apparatus having an external source of air pressure. The holster can be mounted on the unobstructed vertical walls surrounding or proximate the table top. The pipette gun and pipette can be parked in the holster while not in use, thereby preventing contamination of the pipette or spillage of fluid from the pipette when the gun is parked in the holster.

The remote air source is connected to the pipette gun with a recoiling, elastomeric tubing which does not interfere with the work area. In one embodiment, the remote air source is automatically activated and inactivated when the pipette gun is removed from and inserted into, respectively, the holster so that the life-span of the remote air pressure source is extended.

The apparatus of the invention generally comprises a pipette gun having a remote source of positive and negative air pressure, and a gun holster. The holster is constructed and arranged to support the gun above a work table with the pipette connector oriented generally, vertically downwardly.

The pipette gun has an external, flexible conduit connecting the gun to the remote air pressure source. The pipette gun housing has a hand grip portion and a barrel portion oriented transverse to the hand grip portion. A pipette connector is fixed to and oriented transverse to the barrel portion. An internal conduit is connected to the external flexible conduit and the pipette connector. A valve is located intermediate the internal conduit and is constructed and arranged to selectively regulate the flow of either positive air pressure or negative air pressure through the internal conduit to the pipette connector. A positive air flow trigger and a negative air flow trigger are connected to the valve.

The holster has a base and means for fastening the base to a vertical wall. A mounting bracket is fixed to and extends transverse to the base. The bracket has a bottomless socket constructed and arranged to receive and removably hold the gun by inserting the pipette connector into the socket. The base is removably attached to a vertical surface by suction cups, velcro tabs, magnets, or other releasable fasteners.

The external conduit comprises two-channel plastic tubing having a recoiling portion. One end of the recoiling portion is connected to the gun and the other end of the recoiling portion is connected to the base. The external conduit also has a non-recoiling portion extending from the base to the air pressure source. A male prong connector is fixed to the base for removably joining the recoiling portion and non-recoiling portion of the external conduit.

In one embodiment, the mounting bracket comprises a pair of forks having a base end and a plurality of prongs. The base end of the forks is fixed to the holster base at vertically-spaced locations.

The socket is circular and is formed in between the prongs of each of the forks. The socket has a diameter DS larger than the distance between the prongs DP of the forks.

The pipette connector may have a constant outer diameter DC which is less than DS but greater than DP. In this embodiment, the diameter of the socket DS is greater than DC and the distance between the prongs DP is less than DC.

In another embodiment of the invention, the pipette connector has a frusto-conical shape and having a maximum outer diameter DC1 and a minimum outer diameter DC2. In this embodiment, the diameter of the socket DS1 and the distance between the prongs DP1 of the first fork is greater than the diameter of the socket DS2 and the distance between the prongs DP2 of the second fork, respectively. In this embodiment, DC1 is greater than DP1, DP2 and DS2 but less than DS1. DC2 is greater than DP2 but less than DS1, DP1 and DS2.

In one embodiment of the invention, the remote air pressure source is fixed to the base. A first switch is located proximate the socket. The switch regulates the flow of power to the remote air source. The first switch deactivates the remote air source when the pipette gun is parked in the holster. The switch also energizes the remote air source when the gun is removed from the holster. The apparatus may also include a second switch which deactivates the remote air source independent of the first switch.

A mounting pad removably fixes the external air pressure source to either a vertical or horizontal surface. The mounting pad has a layer of vibration-absorbent material, means for permanently fixing the pad to either a vertical or horizontal surface, and means for removably fixing the remote air pressure source to the pad. In one embodiment, the permanent fixing means comprises a layer of adhesive and the removable fixing means comprises Velcro tab fasteners. The mounting pad may also have a plurality of bores arranged to align with the feet on the remote air source.

The present invention also provides a method of metering fluid using a pipette gun. A pipette gun having a remote air pressure source and holster assembly are provided. The holster is removably fastened to a vertical surface. The pipette gun is supported above a work table with said pipette connector oriented generally, vertically downwardly by parking the pipette gun in the holster. The pipette gun is removed from the holster and fluid is metered with the gun. The external air pressure source is automatically inactivated when the pipette gun is parked in the holster and automatically activated when the pipette gun is removed from the holster.

DETAILED DESCRIPTION OF PREFERRED EMBODIMENTS

Figure 1:
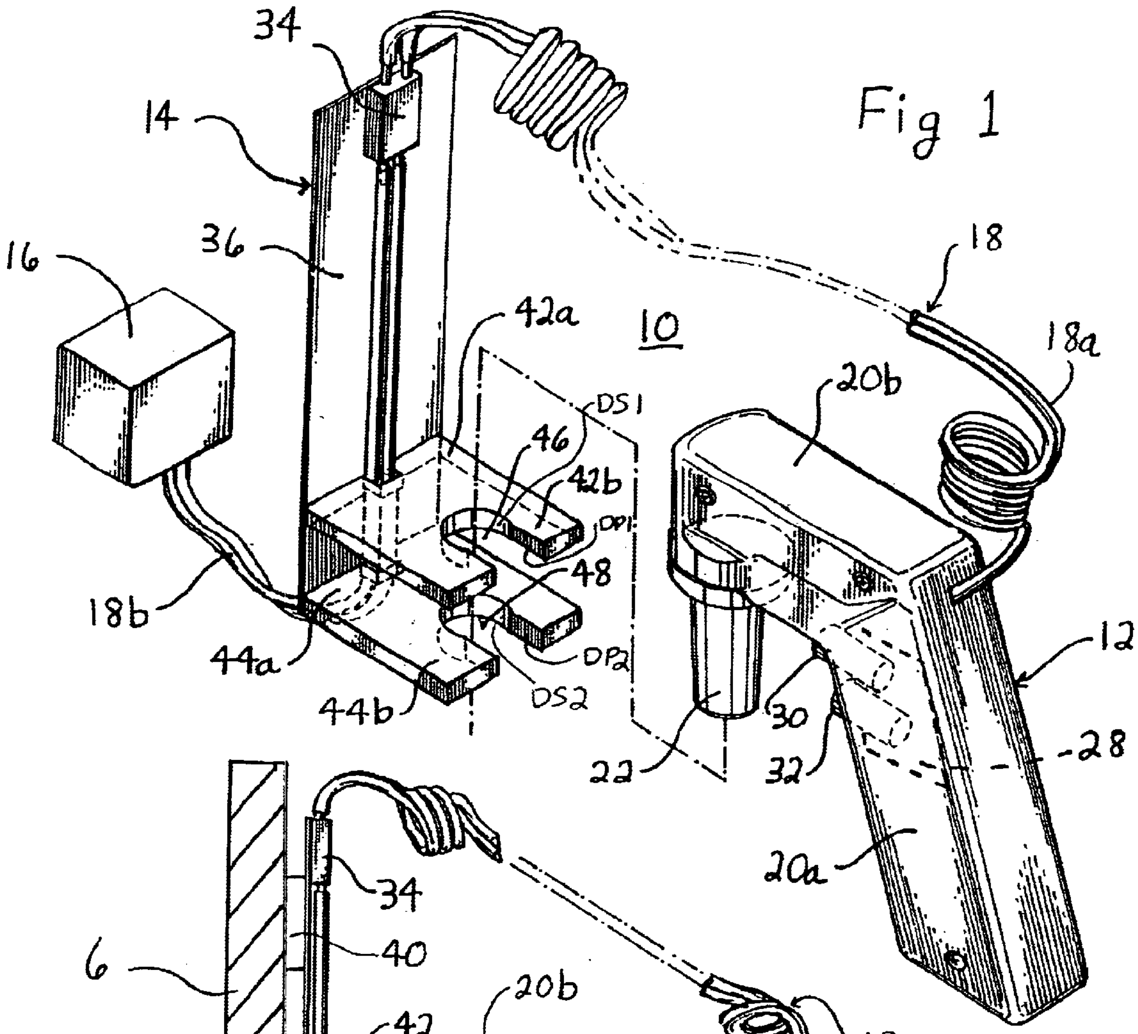
FIG. 1 is a perspective view of a pipette gun and holster apparatus in accordance with an embodiment of the invention.

Preferred embodiments of the invention are described below with reference to FIGS. 1–9 wherein like reference numerals are used throughout to designate like elements.

Figure 2:
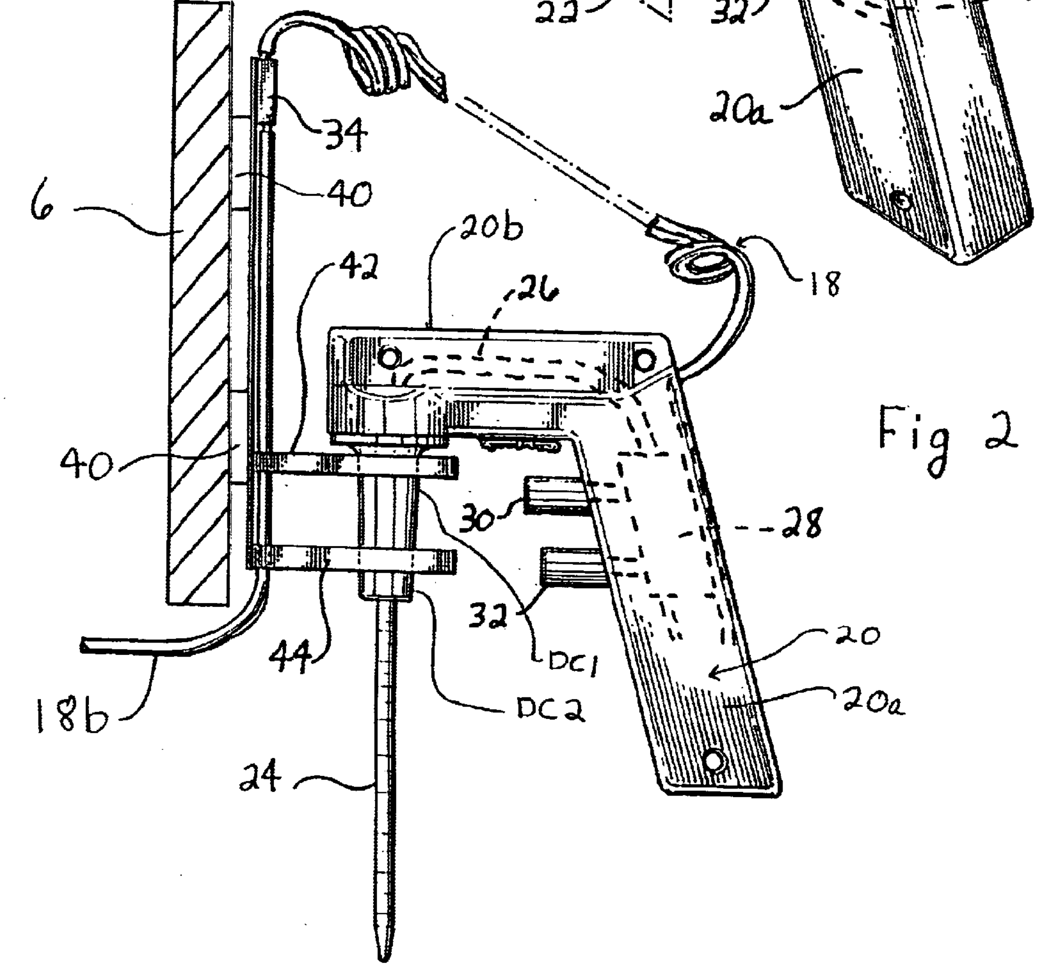
FIG. 2 is a side elevational view of the pipette gun and holster of FIG. 1 without the remote air pressure source.

An embodiment of a pipette gun and holster apparatus of the present invention, designated generally by reference numeral 10, is illustrated in FIGS. 1–7. The apparatus 10 generally comprises a pipette gun 12, a holster 14, and a remote source of positive and negative air pressure 16. The holster 14 is constructed and arranged to be mounted to a vertical surface above or proximate a work table top 4, and to support the pipette gun 112 above the table top 4 with the pipette oriented generally, vertically downwardly, as best seen in FIG. 2.

The pipette gun 12 has an external, flexible conduit 18 connecting the pipette gun 12 to the remote air pressure source 16. The housing 20 of the pipette gun 12 has a hand grip portion 20*a* and a barrel portion 20*b* oriented transverse to the hand grip portion 20*a*. A pipette connector 22 is fixed to and oriented downwardly transverse to the barrel portion 20*b*. The pipette connector is constructed and arranged to removably attach pipettes 24 of various lengths and diameters.

An internal conduit 26 connects the external flexible conduit 18 to the pipette connector 22. A valve 28 is located intermediate the internal conduit 26. The valve 28 is constructed and arranged to selectively regulate the flow of either positive or negative air pressure through the internal conduit 26 to the pipette connector 22. A positive air flow trigger 30 and a negative air flow trigger 32 are connected to the valve 28 and extend outwardly from the handle portion 20*b* of the housing 20.

In the embodiment illustrated in FIGS. 1–7, the external flexible conduit 18 comprises two separate conduits which are connected to each other on the external surface. The conduit 18 has a recoiling portion 18*a* and a non-recoiling portion 18*b*. The recoiling portion 18*a* is connected at one end to the internal conduit 26 of the pipette gun 12 proximate the top of the hand grip portion 20*a* of the housing 20. The other end of the recoiling portion 18*a* is connected to a male prong connector 34 fixed to the top of the base of the holster 14. When the holster 14 is mounted on a vertical wall 6 above the table top 4, the recoiling conduit portion automatically retracts to prevent the flexible conduit 18 from interfering with objects supported on the table top 4. Further, the recoiling portion 18*a* of the flexible conduit 18 slightly biases the pipette gun 12 upwardly when the pipette gun 12 is removed from the holster 14, thereby effectively reducing the weight of the gun and reducing fatigue on the operator.

One end of the non-recoiling portion 18*b* of the flexible conduit 18 is connected to the male prong connector 34. The other end of the non-recoiling portion 18*b* is connected to the remote air source 16. In the embodiment illustrated in FIGS. 1–2, the non-recoiling portion 18*b* of the flexible conduit 18 extends downwardly parallel to the length of the holster 14 and through the holster forks 42,44.

The holster 14 is constructed and arranged to be removably fixed to a vertical surface or wall 6 and to support the pipette gun 12 above the table top 4 with the pipette 24 oriented generally, vertically downwardly such as illustrated in FIG. 2. The holster 14 has a generally flat, rectangular base 36, fasteners 40 which removably fix the base 36 to the vertical wall 6, and a pair of forks 42, 44, fixed to and extending transverse to the base 36. Each fork 42, 44 has a bottomless socket constructed and arranged to receive and removably hold the pipette gun 12 by inserting the pipette connector 22 into the sockets 46, 48.

Figure 8:
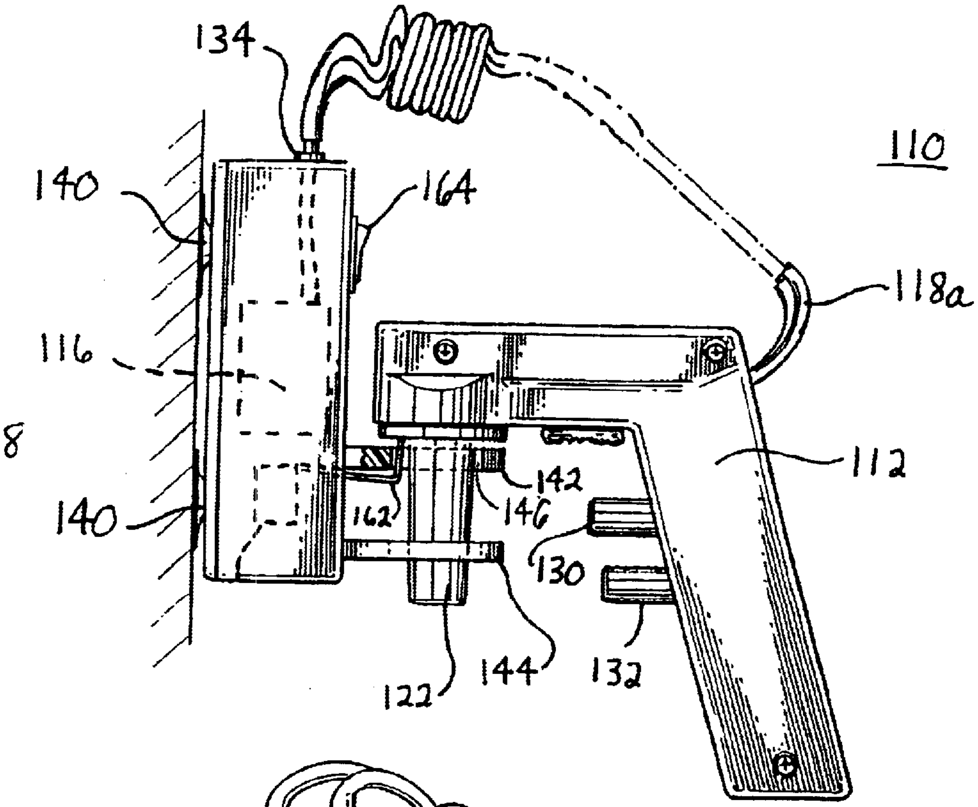
FIG. 8 is a perspective view of another pipette gun and holster apparatus in accordance with an embodiment of the invention; and, FIG. 9 is a front elevational view of the holster of the apparatus of FIG. 8 and a universal ad/dc adapter.
Figure 9:
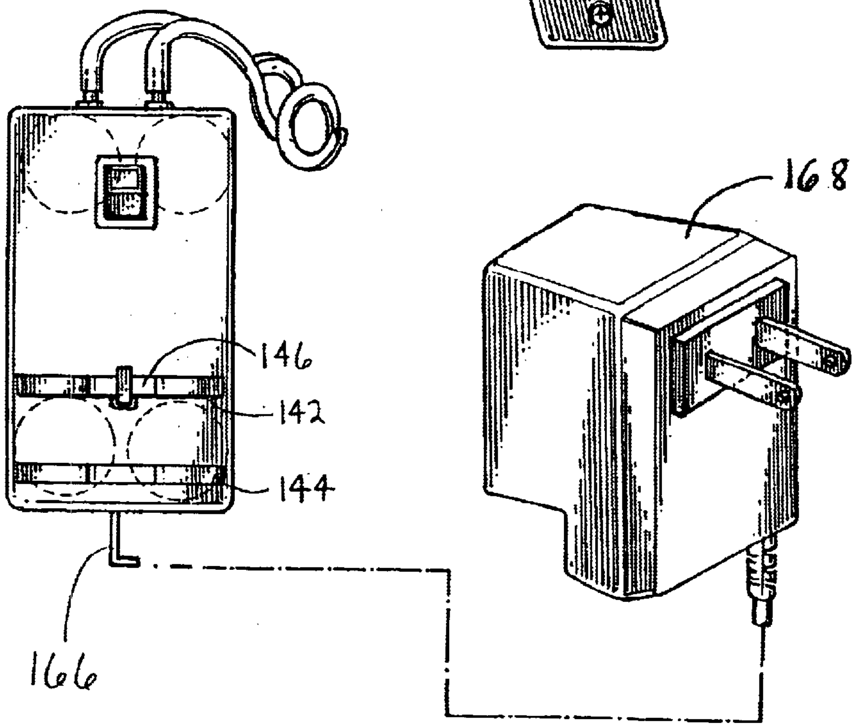

In the embodiment illustrated in FIGS. 1–7, the base 36 comprises a thin metal sheet. The fasteners 40 are preferably fixed to the backside of the base 36 and may comprise magnets or velcro tabs, such as illustrated in FIGS. 1 and 2, or suction cups 140 such as illustrated in FIGS. 8 and 9.

Referring to FIGS. 1 and 2, each fork 42,44 has a base end 42*a*,44*a* fixed to the base, and a pair of prongs 42*b*,44*b*. The forks 42,44 are fixed to the bottom end of the base 36 at vertically-spaced locations. Each fork 42,44 has a circular socket 46,48, respectively, formed in between the prongs of each fork 42,44, respectively. The diameter of the first socket DS1 and second socket DS2 are both larger than the distance DP between the prongs of the respective forks 42,44. The distance DP between the prongs of the forks 42,44 is larger than the diameter of the pipette 24.

In the embodiment illustrated in FIGS. 1–9, the pipette connector 22 has a frusto-conical shape having a maximum outer diameter DC1 and a minimum outer diameter DC2. The diameter of the socket DS1 of the first fork 42 is larger than the diameter of the socket DS2 of the second fork 44 so that the tapered pipette connector 22 will park snugly in the mounting bracket 38. DC1 is greater than DP1, DP2 and DS2 but less than DS1. DC2 is greater than DP2 but less than DS1, DP1 and DS2.

Figure 3:
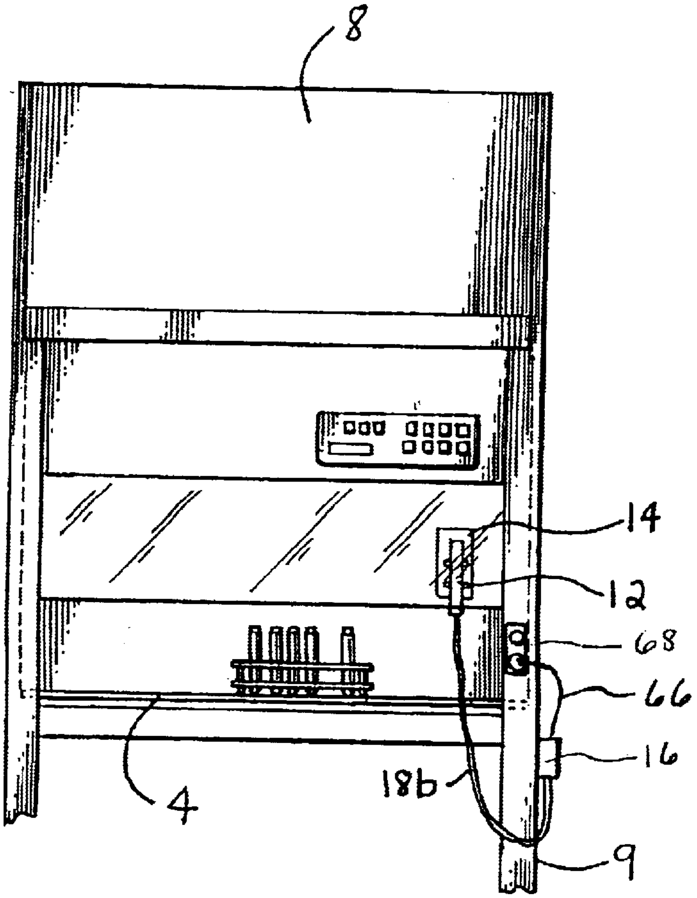
FIG. 3 is a front elevational view of a laminar flow hood outfitted with the pipette gun and holster apparatus of FIG. 1 showing the pipette gun parked in the holster.
Figure 4:
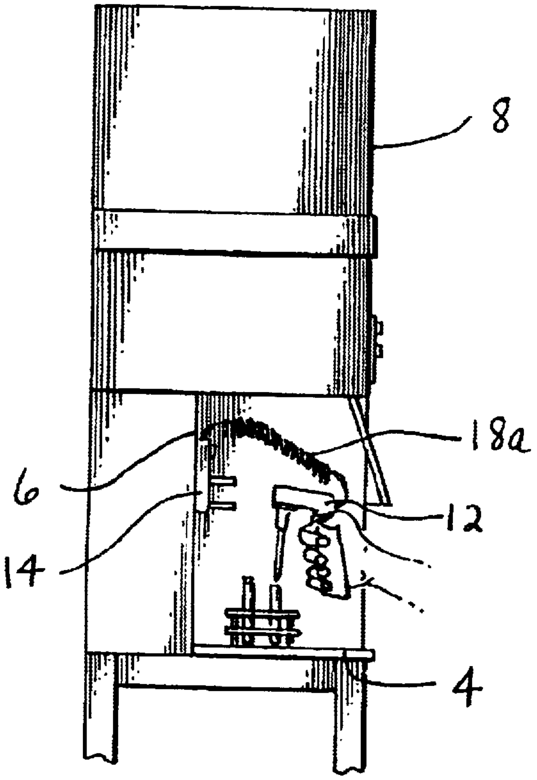
FIG. 4 is a front elevational view of a laminar flow hood outfitted with the pipette gun and holster apparatus of FIG. 1 showing the pipette gun removed from the holster and held by a technician.

An embodiment of the pipette gun and holster apparatus of the invention is illustrated in use with a laminar flow hood 8 in FIGS. 3 and 4. Referring to FIG. 3, the pipette gun 12 is parked in the holster 14 which is mounted to the back, vertically-extending wall 6 of the laminar flow hood 8. The remote air source 16 is mounted oh a vertically-extending outer surface 9 of the laminar flow hood 8 using a pump mounting pad 50 described below. The pipette gun 12 is shown in FIG. 4 removed from the holster and grasped by a technician.

Figure 5:
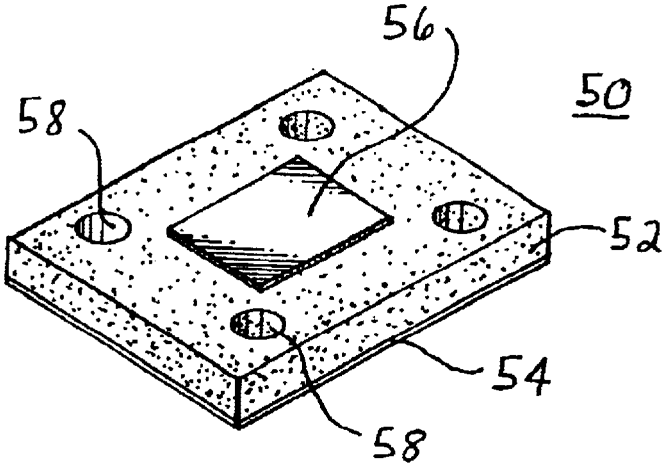
FIG. 5 is a perspective view of a pump mounting pad in accordance with an embodiment of the invention.
Figure 6:
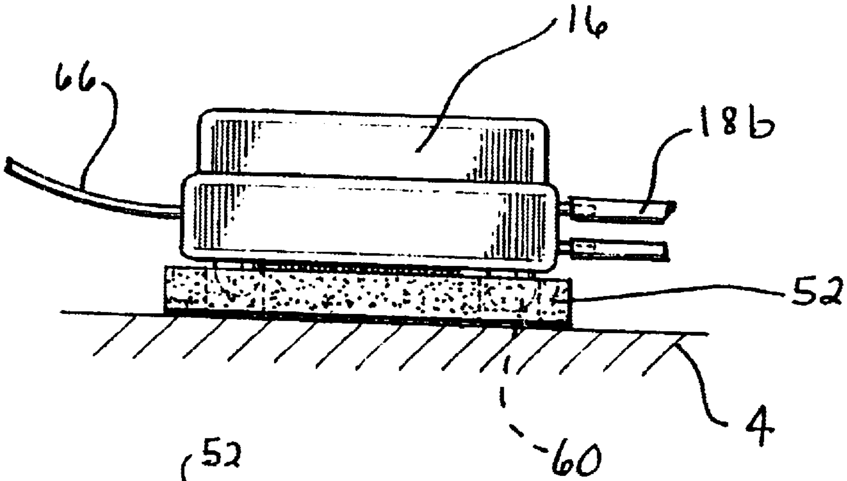
FIG. 6 is a side elevational view of a pump attached to the pump mounting pad of FIG. 5 which is fixed to a horizontal surface.
Figure 7:
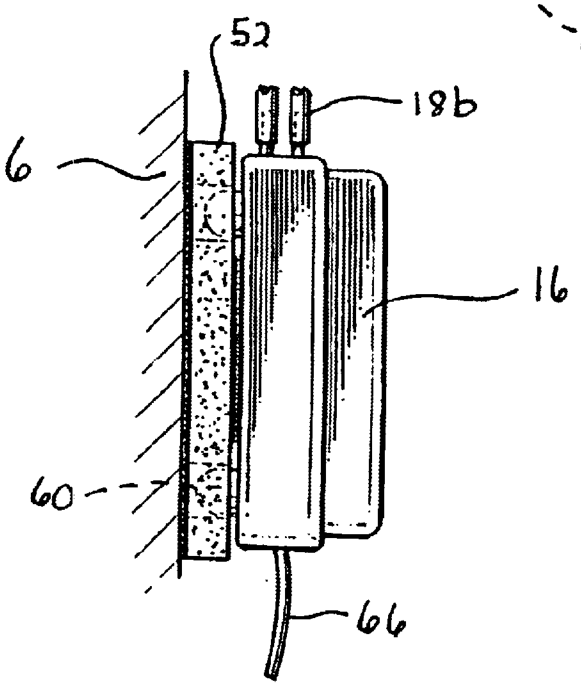
FIG. 7 is a side elevational view of a pump attached to the pump mounting pad of FIG. 5 which is fixed to a vertical surface.

The embodiment of the invention illustrated in FIGS. 1–7 utilizes a remote air pressure source 16 such as a piston pump which often migrates off of the table top due to vibration. The mounting pad 50 of the present invention secures the pump to either a horizontal table top or a vertically-extending wall. Referring to FIGS. 5–7 the pad preferably has a rectangular shape sized to conform to the overall shape and dimensions of well-known piston pumps. The pad 50 has a vibration-absorbing base layer 52, means on the bottom side of the base layer 52 for permanently fixing the pad to either a vertical 5 or horizontal 4 surface, and means on the top side of the pad 50 for removably fixing the pump 16 to the top side of the mounting pad 50. In a preferred embodiment, the permanent fixing means 54 on the bottom of the pad 50 comprises an adhesive layer while the removable fixing means 56 on the top side of the pad 50 comprises mating velcro tabs.

The mounting pad 50 is provided with a plurality of holes or bores 58 which are aligned with and designed to receive the feet 60 of the pump 16. The mounting pad 50 allows the pump 16 to be securely fixed on a horizontal table top 4 such as illustrated in FIG. 6 or on a vertical wall surface 6 such as illustrated in FIG. 7.

Another embodiment of the pipette gun and holster apparatus 110 of the present invention is illustrated in FIGS. 8 and 9. The pipette gun 112 illustrated in FIGS. 8 and 9 has generally the same construction as the pipette gun 12 illustrated and described above with reference to FIGS. 1–7. The pipette gun 112 also has a recoiling flexible conduit 118*a* extending from the pipette gun 112 to a male prong connector 134 on the base 136. However, in this embodiment, the remote air pressure source 116 is contained within or integrally formed with the base 136 of the-holster 114.

Further, the base 136 includes a first switch 162 proximate the socket 146 of the first fork 142 which regulates the flow of electrical power to the remote air source 116. The first switch 162 inactivates the remote air source 116 when the pipette gun 112 is parked in the holster 114, and activates the remote air source 116 when the pipette gun 112 is removed from the holster 114. Referring to FIG. 8, the first switch 162 is spring-loaded and normally biased upwardly in an "on" position which activates the remote air source 116. When the pipette gun 112 is parked in the holster 114, the pipette connector 122 contacts the first switch 162 and pushes the switch 162 into an "off" position inactivating the remote air source 116. This construction allows the remote air source 116 to run only when the pipette gun 112 is being used by a technician, thereby extending the life of the remote air source 116. The holster 114 may also include a second switch 164 which overrides the first switch in the "off" position to inactivate the remote air source 116.

Since the remote air source is contained with the base 136, the embodiment illustrated in FIGS. 8 and 9 does not have a non-recoiling conduit portion extending from the bottom of the base such as illustrated in FIGS. 1 and 2. Rather, an electrical power line 166 extends out of the bottom of the base to an ac/dc universal adapter 168.

The present invention also provides a method of metering fluid using the above-described apparatus. While the method is described with reference to the well-known laminar flow hood shown in FIGS. 3 and 4, one of ordinary skill in the art will readily recognize that the apparatus 10,110 may be used at any table top having a vertical wall next to or proximate the table top.

The holster 14 is fastened to the vertical back wall of the laminar flow hood. The remote air pressure source 16 is fixed to an outside wall of the hood proximate a power outlet 68. This arrangement maximizes the amount of work space on the table top 4.

When the pipette gun is not in use, the pipette gun is parked in the holster 14 above the table top 4 with the pipette oriented generally, vertically downwardly out of contact with the table top 4. When the pipette gun is needed, the technician easily lifts and removes the pipette gun 12 from the holster 14. The recoiling portion 18*a* of the conduit 18 remains in a tight arrangement above the table top 4 as best seen in FIG. 4.

If the embodiment illustrated in FIGS. 8 and 9 is used in the laminar flow hood 8, the remote power source 116 is automatically activated when the pipette gun 112 is removed from the holster 114 and automatically inactivated when the pipette gun 112 is parked in the holster 114. In this embodiment, the life-span of the air pressure source 116 is extended since it is only activated when the pipette gun 112 is in use.

What is claimed is:

1. A pipette gun and holster apparatus having a remote source of positive and negative air pressure, said apparatus comprising:

a) a pipette gun having an external, flexible conduit connecting said gun to said remote air pressure source, said gun including:
   i) a housing having a hand grip potion and a barrel portion oriented transverse to said hand grip portion;
   ii) a pipette connector fixed to and oriented transverse to said barrel portion;
   iii) an internal conduit connected to said external flexible conduit and said pipette connector;
   iv) a valve intermediate said internal conduit which selectively regulates the flow of either positive air pressure or negative air pressure through said internal conduit to said pipette connector;

v) a positive air flow trigger and a negative air flow trigger connected to said valve;

b) a gun holster which supports said gun above a work table with said pipette connector oriented downwardly, said holster including:

i) a base;

ii) means for fastening said base to a vertical wall;

iii) a mounting bracket fixed to and extending transverse to said base, said bracket including a fork having a base end and a plurality of prongs, and a socket formed in between said prongs, said socket having an open top, an open bottom, and diameter which is larger than the distance between said prongs, said socket removably holding said gun with said pipette connector oriented downwardly by passing the pipette through said prongs and inserting said pipette connector into said socket through the top, including a first switch proximate said socket, said switch regulating said remote air source.

2. The apparatus recited in claim 1, said first switch deactivating said remote air source when said gun is parked in said holster, and said first switch energizing said remote air source when said gun is removed from said holster.

3. The apparatus recited in claim 2, including a second switch which deactivates said remote air source independent of said first switch.

4. A holster for supporting a pipette gun on a vertical surface above or proximate a table top, said pipette gun having a negative and positive air pressure source, pipette connector and a pipette attached to said connector, said holster comprising:

a) a base;

b) means for fastening said base to a vertical wall;

c) a mounting bracket fixed to and extending transverse to said base, said bracket including a fork having a base end and a plurality of prongs, and a socket formed in between said prongs, said socket having an open top, an open bottom, and diameter which is larger than the distance between said prongs, said socket removably holding the gun with the pipette connector oriented downwardly by passing the pipette through said prongs and inserting the pipette connector into said socket through the top, including a first switch proximate said socket, said first switch deactivating said air source when the pipette gun is parked in said holster and energizing said air source when the pipette gun is removed from said holster.

5. The holster recited in claim 4, said mounting bracket comprising a pair of forks having a base end and a plurality of prongs, the base end of said forks being fixed to said holster base at vertically-spaced locations, said socket being circular and being formed in between the base end of at least one of said forks and the end of the prongs of said at least one fork.

6. The apparatus recited in claim 5, said socket having a diameter DS larger than the distance DP between the prongs of said at least one fork, a diameter DS greater than the maximum outer diameter DC of the pipette connector, and a distance DP less than DC.

7. The apparatus recited in claim 5, wherein the diameter DS1 of the socket and the distance DP1 between the prongs of the first fork is greater than the diameter DS2 of the socket and the distance DP2 between the prongs of the second fork, respectively.

8. The apparatus recited in claim 7 for use with a pipette gun having a frusto-conical shaped pipette connector, a maximum outer diameter DC1, and a minimum outer diameter DC2, DC1 being greater than DP1, DP2 and DS2 but less than DS1, DC2 being less than DS1, DP1 and DS2.

9. A method of metering fluid using a pipette gun, comprising the steps of:

a) providing a pipette gun having a remote air pressure source and holster assembly, said holster having a base, means for fastening said base to a vertical surface, a mounting bracket fixed to and extending transverse to said base, said bracket including a fork having a base end and a plurality of prongs, and a socket formed in between said prongs, said socket having an open top, an open bottom, and diameter which is larger than the distance between said prongs, said socket removably holding said gun with aid pipette connector oriented downwardly by passing the pipette through the prongs and inserting said pipette connector into said socket through the top so that said pipette connector engages said socket;

b) removably fastening said holster to a vertical surface next to or proximate a horizontal work table top;

c) parking the pipette gun in the holster above the work table with said pipette connector and pipette oriented downwardly out of contact with the table top;

d) removing said pipette gun from said holster and metering fluid with said gun, and, e) automatically inactivating said external air pressure source when said pipette gun is parked in said holster and automatically activating said external air pressure source when said pipette gun is removed from said holster.

10. A pipette gun and holster apparatus having a remote source of positive and negative air pressure, said apparatus comprising:

a) a pipette gun having an external, flexible conduit connecting said gun to said remote air pressure source, said gun including:

i) a housing having a hand grip portion and a barrel portion oriented transverse to said hand grip portion;

ii) a pipette connector fixed to and oriented transverse to said barrel portion;

iii) an internal conduit connected to said external flexible conduit and said pipette connector;

iv) a valve intermediate said internal conduit which selectively regulates the flow of either positive air pressure or negative air pressure through said internal conduit to said pipette connector;

v) a positive air flow trigger and a negative air flow trigger connected to said valve;

b) a gun bolster which supports said gun above a work table with said pipette connector oriented downwardly, said holster including:

i) a base;

ii) means for fastening said base to a vertical wall;

iii) a mounting bracket fixed to and extending transverse to said base, said bracket having a bottomless socket which removably holds said gun by inserting said pipette connector into said socket, including a first switch proximate said socket, said switch regulating the flow of power to said remote air source.

11. The apparatus recited in claim 10, said first switch deactivating said remote air source when said pipette gun is parked in said holster, and said first switch energizing said remote air source when said pipette gun is removed from said holster.

12. The apparatus recited in claim 10, including a second switch which deactivates said remote air source independent of said first switch.

13. A holster for supporting a pipette gun on a vertical surface above or proximate a table top, said pipette gun having a negative and positive air pressure source, pipette connector and a pipette attached to said connector, said holster comprising:

a) a base;

b) means for fastening said base to a vertical wall;

c) a mounting bracket fixed to and extending transverse to said base, said bracket hating a bottomless socket which removably holds said gun by inserting said pipette connector into said socket, wherein said holster supports said gun above a work table with said pipette connector oriented downwardly, including a first switch proximate said socket, said first switch deactivating said air source when the pipette gun is parked in said holster and energizing said air source when the pipette gun is removed from said holster.

14. The holster recited in claim 13, said mounting bracket comprising a pair of forks having a base end and a plurality of prongs, the base end of said forks being fixed to said holster base at vertically-spaced locations, said socket being circular and being formed in between the prongs of each of said forks.

15. The apparatus recited in claim 14, said socket having a diameter DS larger than the distance DP between the prongs of said forks, a diameter DS greater than the maximum outer diameter DC of the pipette connector, and a distance DP less than DC.

16. The apparatus recited in claim 14, wherein the diameter DS1 of the socket and the distance DP1 between the prongs of the first fork is greater than the diameter DS2 of the socket and the distance DP2 between the prongs of the second fork, respectively.

17. The apparatus recited in claim 16 for use with a pipette gun having a frusto-conical shaped pipette connector, a maximum outer diameter DC1, and a minimum outer diameter DC2, DC1 being greater than DP1, DP2 and DS2 but less than DS1, DC2 being less than DS1, DP1 and DS2.

* * * * *